United States Patent [19]
Suau et al.

[11] Patent Number: 5,998,526
[45] Date of Patent: Dec. 7, 1999

[54] USE OF SALTS OF POLYASPARTIC ACIDS AS MILLING AGENTS

[75] Inventors: Jean-Marc Suau, Lucenay; Christian Jacquemet, Lyons; Jacques Mongoin, Quincieux, all of France

[73] Assignee: Coatex S.A., Genay, France

[21] Appl. No.: 09/022,533

[22] Filed: Feb. 12, 1998

[51] Int. Cl.[6] ...................................................... C08K 3/26
[52] U.S. Cl. ........................... 524/425; 524/601; 524/602
[58] Field of Search ..................................... 524/601, 602, 524/425

[56] References Cited

U.S. PATENT DOCUMENTS

| | | | |
|---|---|---|---|
| 4,278,208 | 7/1981 | Falcon-Steward | 241/16 |
| 4,554,307 | 11/1985 | Farrer et al. | 524/425 |
| 4,704,242 | 11/1987 | Bandyopadhyay et al. | 264/234 |
| 5,525,257 | 6/1996 | Kleinstuck et al. | 252/181 |
| 5,616,544 | 4/1997 | Kalota et al. | 508/508 |

FOREIGN PATENT DOCUMENTS

| | | |
|---|---|---|
| WO 92/15535 | 9/1992 | WIPO . |
| WO 94/19409 | 9/1994 | WIPO . |

OTHER PUBLICATIONS

Patent Abstracts of Japan, vol. 95, No. 10, Nov. 30, 1995, JP 07 172888, Jul. 11, 1995.

*Primary Examiner*—Donald R. Wilson
*Assistant Examiner*—Ling Siu Choi
*Attorney, Agent, or Firm*—Oblon, Spivak, McClelland, Maier & Nuestadt, P.C.

[57] ABSTRACT

Salts of polyaspartic acids are used as milling agents for the milling of mineral materials to obtain aqueous suspensions of finely divided mineral materials which are pumpable and non-sedimenting, and have high concentrations of mineral materials which are useful in papermaking and in paper coating.

19 Claims, No Drawings

USE OF SALTS OF POLYASPARTIC ACIDS AS MILLING AGENTS

BACKGROUND OF THE INVENTION

1. Field of the Invention

The invention relates to the use of salts of polyaspartic acids as agents to assist in the milling (comminution and related processing) of mineral materials in aqueous suspension. The invention also relates to a milling process employing salts of polyaspartic acids as auxiliary milling agents. Further, the invention relates to aqueous suspensions of finely divided minerals which suspensions contain the described agent(s) and are intended for pigment applications in the paper industry.

2. Description of the Related Art

Those skilled in the art, in order to use such an aqueous suspension of minerals in the field of pigments, will seek to carry out comminution of the minerals such that an aqueous suspension is produced in which the particle sizes are extremely fine, indeed as fine as possible, in particular less than a few microns.

At the same time, it is desirable that such a suspension have a Brookfield viscosity which is sufficiently low that any risk of sedimentation, setting, or agglomeration is eliminated. In this way the suspension can be manipulated easily by the user without agitation, even after being allowed to stand in a tank for several days. Such a suspension should also have the maximum possible content of the mineral materials, so as to minimize the manufacturing-related and transport-related costs which are correlated to the amount of water present.

It is problematic to those skilled in the art to devise milling operations in aqueous media, i.e. operations wherein the sizes of mineral particles are reduced and their specific surface is increased, which operations will result in the described ideal suspensions which combine all the desired fundamental qualities.

The problems which arise during the milling operations in aqueous media at high concentrations of the mineral materials, said problems including notably a rapid increase in viscosity which is experienced, are due to the fineness of the particles. Setting of the suspensions in the storage tanks can occur, or clogging of the milling implements. Such problems are not encountered in operations confined to dispersion of a mineral material in a liquid where the object is to effect the dispersion without changing the sizes of the particles of the mineral material.

It has been long known to use water-soluble polymers based on polyacrylic acid or its derivatives as milling agents (Eur. Pats. 0,100,947, 0,542,643, and 0,542,644), for the purpose of preparing aqueous suspensions of minerals which satisfy the abovementioned quality criteria. However, a drawback of such known milling agents is poor biodegradability.

The prior art did not offer those skilled in the art a satisfactory means of solving this problem of using a milling agent for mineral materials which enables the preparation of aqueous suspensions of finely divided mineral materials of high concentration in such materials, wherewith the minerals do not settle and the suspensions are pumpable and are environmentally benign.

SUMMARY OF THE INVENTION

After numerous attempts, the Applicant discovered, in connection with the present invention, that the use of salts of polyaspartic acids as milling agents enables the above-described problems to be solved, whereby one can obtain aqueous suspensions of finely divided mineral materials of high concentration in such materials, wherewith the minerals do not settle and the suspensions are pumpable and contain biodegradable milling agents. The use of such agents, starting with natural products, provides a novel approach which differs from the known approach employing acrylics.

The use of salts of polyaspartic acids as agents for dispersing materials such as calcium carbonate is disclosed in PCT Apps. WO 94/19409 and WO 92/15535. However, these publications nowhere indicate the use of such polymers as milling agents for mineral materials in aqueous suspensions which are pumpable, non-sedimenting, have high dry matter content, and have uses in the paper industry.

The Applicant's knowledge of the suitable ranges of molecular weights for acrylics did not carry over into applications with salts of polyaspartic acids. The Applicant discovered, in connection with the present invention, that the use of salts of polyaspartic acids of weight average molecular weight in the range 3500–25000, preferably in the range 4000–10000, particularly preferably in the range 5300–8000, enables one to produce suspensions of finely divided mineral materials of fine particle size, which suspensions are pumpable and non-sedimenting, and yet have high dry matter content.

Accordingly, an object of the present invention is the use of salts of polyaspartic acids as milling agents in the preparation of aqueous suspensions of mineral substances, which suspensions are pumpable, non-sedimenting, highly concentrated in the mineral materials, and of fine particle size; in particular with particle sizes as fine as possible, e.g. with median diameter less than 3 micron, and preferably with median diameter less than 1 micron; and said suspensions having Brookfield viscosity which increases only slightly over time, i.e. wherewith even after storage for a number of days (or even weeks) in tanks without agitation the viscosity is sufficiently low to permit easy handling by the user.

Another object of the invention is a method of milling of mineral particles in aqueous suspension, with the use of selected salts of polyaspartic acids as milling agents.

A further object of the invention is to provide aqueous suspensions of finely divided minerals, which suspensions are non-sedimenting, pumpable, and highly concentrated in the mineral substances.

These suspensions according to the invention are intended for pigment applications and have particle sizes as fine as possible, e.g. with median diameter less than 3 micron, and preferably with median diameter less than 1 micron. The viscosity of the suspensions increases only slightly over time, despite a high concentration of the mineral materials, in particular a concentration of at least 70%.

Yet another object of the invention is the use of the described aqueous suspensions of finely divided minerals for applications as fillers in paper pulp formulation, and for applications in paper coating.

The stated objects are achieved according to the invention by the use of salts of polyaspartic acids as milling agents.

DETAILED DESCRIPTION OF THE PREFERRED EMBODIMENTS

The salts of polyaspartic acids of interest are particularly obtained by hydrolysis and neutralization of products of the thermal condensation of aspartic acids, with or without a catalyst (e.g. a strong acid to increase the molecular weight, or a hydroxylated polycarboxylic acid to reduce the molecular weight). The salts may also be obtained by static or dynamic treatment and fractionation of salts of polyaspartic acids, with the aid of one or more solvents. The polyaspartic acids are obtained by thermal condensation of aspartic acids. The aspartic acids are obtained by any of the known synthetic methods, e.g. enzymatic synthesis from starch or chemical synthesis from maleic anhydride and/or fumaric acid. The salts of polyaspartic acids of interest are chosen from among the salts of polyaspartic acids having weight average molecular weight, measured by GPC in the aqueous phase with the use of standard sodium polyacrylates as standards (obtained from the firm Polymer Standards Services, of Germany), in the range 3500–25,000, preferably 4000–10,000, particularly preferably 5300–8000; and are chosen from among the polyaspartates neutralized by at least one agent of hydrolysis and neutralization having a monovalent function, or by a combination of at least one agent of hydrolysis and neutralization having a monovalent function with at least one agent of hydrolysis and neutralization having a polyvalent function.

For the sake of better understanding of one of the objects of the invention, it is desirable to state that the Applicant defines the term "agent of hydrolysis and neutralization having a monovalent function" as an agent capable of reacting with the imide site which is the precursor of a polyaspartic acid, and defines the term "agent of hydrolysis and neutralization having a polyvalent function" as an agent capable of reacting with a number of such imide sites, which number corresponds to the valence of the neutralizing cation.

Also, the Applicant defines the term "polyaspartic acids" as homopolymers of aspartic acids resulting from thermal polycondensation of aspartic acids, catalyzed or not, where "aspartic acids" means L- or D-aspartic acid or mixtures of these; or resulting from the processing of maleic anhydride and/or fumaric acid. The term "polyaspartic acids" also includes mixtures of homopolymers of aspartic acids with homopolymers of acrylic acid or with polysuccinimide; or mixtures of homopolymers of aspartic acids with copolymers comprised of units of acrylic acid and one or more other ethylenically unsaturated monomers, e.g. methacrylic acid, maleic anhydride, acrylamide, methacrylamide, acrylamidomethylpropanesulfonic acid, or phosphoric acid esters of hydroxy(m)ethyl(meth)acrylate; or mixtures of these.

The agent of hydrolysis and neutralization having a monovalent function is chosen from among the group comprised of compounds containing alkali cations, particularly sodium and potassium, or ammonium, and the primary or secondary aliphatic and/or cyclic amines (e.g. ethanolamines, mono- and diethylamine, or cyclohexylamine).

The agent of hydrolysis and neutralization having a polyvalent function is chosen from the group comprised of:
compounds containing alkaline earth divalent cations, particularly magnesium and calcium, or zinc; and
compounds containing trivalent cations, particularly aluminum; or
certain compounds containing cations of higher valence.

The reaction of hydrolysis and neutralization of imide sites which are precursors of polyaspartic acids may be brought about by combinations of at least one agent of hydrolysis and neutralization having a monovalent function and at least one agent of hydrolysis and neutralization having a polyvalent function.

Among the possible combinations of two or three agents of hydrolysis and neutralization which are suitable are combinations of an agent (i.e. one or two agents) having a monovalent function and an agent having a divalent or trivalent function, as indicated in the following examples:
$Ca^{++}$ with $Na^+$ and/or $K^+$ and/or $NH_4^+$,
$Mg^{++}$ with $Na^+$ and/or $K^+$ and/or $NH_4^+$,
$Zn^{++}$ with $Na^+$ and/or $K^+$ and/or $NH_4^+$,
$Al^{+++}$ with $Na^+$ and/or $K^+$ and/or $NH_4^+$,
an amine with $Na^+$ and/or $K^+$ and/or $NH_4^+$.

The possible combinations of agents of hydrolysis and neutralization are not limited to the illustrative examples given.

Each agent of hydrolysis and neutralization employed to produce a polymer used according to the invention as a milling agent intervenes in neutralization in proportions according to the respective valence functions.

In a variant, the salts of polyaspartic acids used according to the invention as milling agents may be prepared from fractions of salts prepared with well known methods of synthesis of polyaspartic acids, wherewith after the preparation the salts are separated so as to obtain salts of polyaspartic acids having weight average molecular weight in the range 3500–25,000, preferably 4000–10,000, particularly preferably 5300–8000, measured by GPC in the aqueous phase with the use of standard sodium polyacrylates as standards (obtained in weight average molecular weights MW in the range 2000–18,000 under the product designations "PSS-PAA" from the firm Polymer Standards Services, of Germany). It should be mentioned here that all weight average molecular weights given for salts of polyaspartic acids in the present Patent Application are as determined by GPC in an aqueous phase, with the use of the abovementioned standard sodium polyacrylates as standards.

Generally, the fraction of salts of polyaspartic acids having weight average molecular weight in the range 3500–25,000, preferably 4000–10,000, particularly preferably 5300–8000, for use as milling agents, is isolated and extracted from the solution which results from the hydrolysis and neutralization of polyaspartic acids by at least one agent of hydrolysis and neutralization having a monovalent function or by a combination of at least one agent of hydrolysis and neutralization having a monovalent function and at least one agent of hydrolysis and neutralization having a polyvalent function (with "polyaspartic acids" being defined broadly as above).

This solution of the polymer resulting from the hydrolysis and neutralization is treated with static or dynamic methods known to persons skilled in the art, with the use of one or more solvents, particularly solvents from the group comprising water, methanol, ethanol, propanol, isopropanol, the butanols, acetone, tetrahydrofuran, and mixtures of these. Thereafter, a separation into two phases is brought about, which are collected. At least one of the phases constitutes the described fraction of salts of polyaspartic acids hydrolyzed and neutralized by at least one agent of hydrolysis and neutralization having a monovalent function or by a combination of at least one agent of hydrolysis and neutralization having a monovalent function and at least one agent of hydrolysis and neutralization having a polyvalent function. This fraction has weight average molecular weight in the range 3500–25,000,, preferably 4000–10,000, particularly preferably 5300–8000.

The phases obtained may then be subjected to distillation to remove the solvent(s) used for the fractionation. It is also possible and desirable in certain cases to more precisely select the fraction of the salts of polyaspartic acids, by further treating the abovementioned phases which have been collected, using a new quantity of a polar solvent or mixture of polar solvents, which solvent or mixture may be different from that initially used. Two new phases result. At least one of these is collected, and constitutes a fraction comprising salts of polyaspartic acids having weight average molecular weight in a somewhat narrow range. In practice it has been found to be useful to select a fraction comprising salts of polyaspartic acids hydrolyzed and neutralized by at least one agent of hydrolysis and neutralization having a monovalent function or by a combination of at least one agent of hydrolysis and neutralization having a monovalent function and at least one agent of hydrolysis and neutralization having a polyvalent function, which salts have a weight average molecular weight in the range 3500–25,000, preferably 4000–10,000, particularly preferably 5300–8000.

The resulting liquid phase comprised of salts of polyaspartic acids may be used in this form as a milling agent for mineral substances which are to be comminuted; or said liquid phase may be treated by any known treatment which will eliminate the liquid phase and isolate the salts of polyaspartic acids as a fine powder which may be used as a milling agent in this other form.

In practice, the milling of the mineral substance consists of comminuting it to yield very fine particles, by means of a milling body, in an aqueous medium containing the salt(s) of polyaspartic acids employed as a milling agent, according to the invention. With the aid of said milling agent, an aqueous suspension of the mineral substance to be milled is formed, with the particles of the mineral substance having particle size equal to at most 50 micron, in a quantity such that the dry matter content of the suspension is at least 70 wt. %.

Advantageously, the milling bodies added to the suspension of the mineral substance to be milled have particle sizes in the range 0.20 mm to 4 mm. In general, the milling bodies are comprised of any of a wide variety of materials, e.g. silicon oxide, aluminum oxide, zirconium oxide, mixtures of these, hard synthetic resins, steels, and other materials.

Preferably the milling bodies are added to the suspension in an amount such that the ratio of the weight of this milling material and the weight of the mineral substance to be milled is at least 2:1, and preferably is between the limits 3:1 and 5:1.

The mixture of the suspension and the milling bodies is then subjected to an agitation-type mechanical action of the type achieved in a classical microelement mill.

The milling agent is introduced into the mixture formed by the aqueous suspension of mineral substances and the milling bodies. The amount of milling agent is 0.2–2 wt. % (determined as the ratio of the dry weight of the said polymers to the dry weight of the mineral substance being milled).

The time needed to achieve good fineness of the mineral substance after milling varies according to the nature and quantity the mineral substances to be milled, the method of agitation, and the temperature of the medium during the milling.

According to the invention, the method of accomplishing the milling in an aqueous suspension having a high concentration of mineral material, for use in pigment applications, consists of milling an aqueous suspension of the minerals to yield a fine suspension; characterized in that one uses as a milling agent salts of polyaspartic acids having a weight average molecular weight in the range 3500–25,000, preferably 4000–10,000, particularly preferably 5300–8000, wherewith said milling agent is used in the amount of 0.2–2 wt. % (determined as the ratio of the dry weight of the said agent to the dry weight of the mineral materials being milled).

The method of milling according to the invention is also characterized in that the aqueous suspension of mineral materials to be milled has a dry matter content of at least 70 wt. %.

The mineral substances milled according to the inventive method may be of wide ranging origin; e.g. they may comprise natural or synthetic calcium carbonate, dolomite, and any other substances which require comminution in order to be used in the intended applications, particularly the manufacture or coating of papers.

The use, according to the invention, of salts of polyaspartic acids as milling agents in processes involving milling and aimed at producing aqueous suspensions of finely divided mineral materials, namely having a median particle diameter less than 3 micron, preferably less than 1 micron, which suspensions are pumpable and non-sedimenting, and have a high concentration of [the] mineral substances, is characterized in that said salts of polyaspartic acids are salts of polyaspartic acids which have been hydrolyzed and neutralized by at least one agent of hydrolysis and neutralization having a monovalent function, or by a combination of at least one agent of hydrolysis and neutralization having a monovalent function and at least one agent of hydrolysis and neutralization having a polyvalent function; and is further characterized in that said salts have a weight average molecular weight in the range 3500–25,000, preferably 4000–10,000, particularly preferably 5300–8000.

The aqueous suspensions according to the invention which are obtained with the use of salts of polyaspartic acids as milling agents are characterized in that they are comprised of one or more salts of polyaspartic acids in the amount of 0.2–2 wt. % (determined as the ratio of the dry weight of the said salt(s) to the dry weight of the aforesaid mineral materials); further in that the median diameter of the comminuted particles is less than 3 micron, preferably less than 1 micron; and in that the concentration of mineral materials (dry basis) is at least 70%.

The particle sizes of the mineral materials were determined with the aid of a "Sedigraph 5100" X-ray granulometer (supplied by the firm Micromeritics).

The importance, usefulness, and applicability of the invention will be better appreciated with the aid of the following Examples, which should not be regarded as limiting the scope of the invention.

EXAMPLES

Example 1

Illustration of the use of various salts of polyaspartic acids as milling agents.

For each Experiment in this Example, a 76 wt. % suspension of calcium carbonate of relatively large particle size in an aqueous medium was prepared, from a natural calcium carbonate having particle sizes not greater than 50 micron, from the region of Orgon, France.

Experiment 1 (Illustrating the Invention)

A polyaspartate neutralized to the extent of 100 mol % with sodium hydroxide and having weight average molecular weight MW=5700 was used.

Experiment 2 (Illustrating the Invention)

A polyaspartate neutralized to the extent of 90 mol % with sodium hydroxide and 10 mol % with lime and having the same weight average molecular weight as in Experiment 1 was used.

Experiment 3 (Illustrating the Invention)

A polyaspartate neutralized to the extent of 80 mol % with sodium hydroxide and 20 mol % with lime and having the same weight average molecular weight as in Experiment 1 was used.

Experiment 4 (Illustrating the Invention)

A polyaspartate neutralized to the extent of 75 mol % with sodium hydroxide and 25 mol % with lime and having the same weight average molecular weight as in the preceding Experiment was used.

Experiment 5 (Illustrating the Invention)

A polyaspartate neutralized to the extent of 70 mol % with sodium hydroxide and 30 mol % with lime and having the same weight average molecular weight as in Experiment 1 was used.

Experiment 6 (Illustrating the Invention)

A polyaspartate neutralized to the extent of 70 mol % with sodium hydroxide and 30 mol % with magnesium hydroxide and having the same weight average molecular weight as in Experiment 1 was used.

Experiment 7 (Illustrating the Invention)

A polyaspartate neutralized to the extent of 65 mol % with sodium hydroxide and 35 mol % with lime and having the same weight average molecular weight as in Experiment 1 was used.

Experiment 8 (Illustrating the Invention)

A polyaspartate neutralized to the extent of 60 mol % with sodium hydroxide and 40 mol % with magnesium hydroxide and having the same weight average molecular weight as in Experiment 1 was used.

Experiment 9 (Illustrating the Invention)

A polyaspartate neutralized to the extent of 55 mol % with sodium hydroxide and 45 mol % with magnesium hydroxide and having the same weight average molecular weight as in Experiment 1 was used.

Experiment 10 (Illustrating the Invention)

A polyaspartate neutralized to the extent of 50 mol % with sodium hydroxide and 50 mol % with magnesium hydroxide and having the same weight average molecular weight as in Experiment 1 was used.

Experiment 11 (Illustrating the Invention)

A polyaspartate neutralized to the extent of 45 mol % with sodium hydroxide and 55 mol % with magnesium hydroxide and having the same weight average molecular weight as in Experiment 1 was used.

For each Experiment, the milling agent was introduced into the suspension, in the amount indicated in Table 1, infra, expressed in wt. % (ratio of dry weight of milling agent introduced to dry weight of the calcium carbonate to be comminuted).

The suspension was circulated in a comminuter of the "Dyno-Mill" type having a fixed cylindrical container and a rotating impeller. The milling bodies consisted of corundum spheres of diameter 0.6–1.0 mm.

The total volume occupied by the milling bodies was 1150 cc, and their total weight was 2900 g.

The volume of the milling chamber was 1400 cc.

The rotational speed of the mill at the circumference was 10 m/sec.

The calcium carbonate suspension was recycled in the amount of 18 liter/hr.

The outlet of the Dyno-Mill was equipped with a separating screen of mesh 200 micron, to separate the milling bodies from the suspension leaving the mill. The temperature was maintained at c. 60° C. during each milling Experiment.

When the milling was completed (time T0), a sample of the pigment suspension was taken into a flask. 80% of the particles in the sample had a dimension less than 1 micron. The viscosity was measured with a Brookfield type RVT viscometer, at 20° C. and rotational speeds 10 rpm and 100 rpm, using a suitable spindle.

After a standing time of 8 da in the flask, the viscosity of the suspension was measured by introduction into the non-agitated flask of the appropriate spindle of the Brookfield type RVT viscosimeter. The viscosity was measured at 20° C. and rotational speeds 10 rpm and 100 rpm (these figures are viscosities "AVAG", measured before agitation).

The suspension was then agitated energetically for a brief time. The viscosity of the suspension was measured again, at 20° C. and rotational speeds 10 rpm and 100 rpm (these figures are the viscosities "APAG", measured after agitation).

All of the experimental results are reported in Table 1, infra. In none of the Experiments was there sedimentation of calcium carbonate.

Each flask was observed visually while in resting condition to see if supernatant was present at the surface of the sample; and a spatula was introduced into each flask to allow determination of whether a deposit had developed at the bottom of the flask. The lack of supernatant and of sediment was confirmed.

|  | Exp. No. | Neutralization (ion %/ion %) | MW | Dry Matter in the suspension (%) | Amount of the agent used, (%, dry/dry) | At T0 (with 10 rpm) | At T0 (with 100 rpm) | After 8 da (AVAG, with 10 rpm) | After 8 da (AVAG, with 100 rpm) | After 8 da (APAG, with 10 rpm) | After 8 da (APAG with 100 rpm) |
|---|---|---|---|---|---|---|---|---|---|---|---|
| Invention | 1 | 100 NA | 5700 | 76 | 0.94 | 8500 | 2400 | 34700 | 7130 | 24100 | 4430 |
| Invention | 2 | 90 Na/10 Ca | 5700 | 76 | 0.88 | 2300 | 800 | 24300 | 4060 | 3550 | 1370 |
| Invention | 3 | 80 Na/20 Ca | 5700 | 76 | 0.95 | 1680 | 520 | 18800 | 2970 | 3560 | 1180 |
| Invention | 4 | 75 Na/25 Ca | 5700 | 76 | 1.03 | 1480 | 500 | 18790 | 2670 | 2960 | 990 |
| Invention | 5 | 70 Na/30 Ca | 5700 | 76 | 1.05 | 1400 | 470 | 10330 | 1800 | 1620 | 550 |
| Invention | 6 | 70 Na/30 Mg | 5700 | 76 | 1.03 | 1650 | 530 | 5370 | 1775 | 1440 | 530 |
| Invention | 7 | 65 Na/35 Ca | 5700 | 76 | 1.11 | 1550 | 500 | 4550 | 1480 | 1240 | 880 |
| Invention | 8 | 60 Na/40 Mg | 5700 | 76 | 1.09 | 1860 | 580 | 7650 | 1575 | 1810 | 590 |
| Invention | 9 | 55 Na/45 Mg | 5700 | 76 | 1.12 | 1820 | 570 | 6720 | 1480 | 1750 | 510 |
| Invention | 10 | 50 Na/50 Mg | 5700 | 76 | 1.12 | 1900 | 570 | 5250 | 1280 | 1500 | 500 |
| Invention | 11 | 45 Na/55 Mg | 5700 | 76 | 1.23 | 2160 | 660 | 3840 | 1320 | 1670 | 510 |

AVAG: Viscosity measured before agitation of the suspension
APAG: Viscosity measured after agitation of the suspension It is seen from Table 1 that it is possible to obtain aqueous suspensions of calcium carbonate having small particle size, with a high concentration of calcium carbonate, which suspensions are non-sedimenting and pumpable, i.e. manipulable by the user.

Example 2

Illustration of the use of salts of polyaspartic acids having various molecular weights.

For each Experiment in this Example, milling was performed on an aqueous suspension of a natural calcium carbonate having particle sizes less than or equal to 50 micron, from the region of Orgon, France. The operating conditions and apparatus were the same as in the preceding Example, but here salts of polyaspartic acids of different molecular weights were employed.

Experiment 12

A polyaspartate neutralized to the extent of 50 mol % with sodium hydroxide and 50 mol % with magnesium hydroxide and having weight average molecular weight MW=1200 was used. This salt of polyaspartic acids was obtained by fractionation of a polyaspartate of weight average molecular weight MW=5700, with the aid of isopropanol.

The Applicant was unable to carry out milling of the 76% suspension of calcium carbonate, because of a rapid and substantial increase in the Brookfield viscosity of the suspension, even after addition of the abovementioned polyaspartate in an amount greater than 2 dry wt. % (based on the total dry weight of the mineral materials).

Experiment 13

A polyaspartate neutralized to the extent of 50 mol % with sodium hydroxide and 50 mol % with magnesium hydroxide and having weight average molecular weight MW=1800 was used. As previously, this salt of polyaspartic acids was obtained by fractionation of a polyaspartate of weight average molecular weight MW=5700 which had been neutralized to the extent of 50 mol % with sodium hydroxide and 50 mol % with magnesium hydroxide. The fractionation was accomplished with the aid of isopropanol.

As previously, the Applicant was unable to carry out milling of the 76% suspension of calcium carbonate, because of a rapid and substantial increase in the Brookfield viscosity of the suspension.

Experiment 14

A polyaspartate neutralized to the extent of 70 mol % with sodium hydroxide and 30 mol % with lime and having weight average molecular weight MW=2400 was used. This salt of polyaspartic acids was obtained by fractionation, with the aid of isopropanol, of a salt of polyaspartic acids which salt had been neutralized to the extent of 70 mol % with sodium hydroxide and 30 mol % with lime and had weight average molecular weight MW=5700.

Again it was not possible to carry out milling of the 76% suspension, for the reasons which applied in Experiments 12 and 13.

Experiment 15

A sodium salt of polyaspartic acids having weight average molecular weight MW=3700 was used.

An aqueous suspension of calcium carbonate of relatively large particle size which suspension had dry matter concentration 76% was prepared from the same natural calcium carbonate as in the preceding Experiments, using the same apparatus and the same method as described above.

The best comminution which could be attained in the milling corresponded to 66% of the particles having diameter less than 1 micron. It was not possible to achieve better comminution, despite addition of the milling agent in the amount of 1.23 wt. % (ratio of dry weight of the milling agent to dry weight of the calcium carbonate to be milled). The reason for this limit was that the Brookfield viscosity increased too much.

Experiment 16

A polyaspartate neutralized to the extent of 50 mol % with sodium hydroxide and 50 mol % with magnesium hydroxide and having weight average molecular weight MW=4200 was used. This salt of polyaspartic acids was obtained by fractionation, with the aid of isopropanol, of a polyaspartate neutralized to the extent of 50 mol % with sodium hydroxide and 50 mol % with magnesium hydroxide and having weight average molecular weight MW=5700.

The milling resulted in a suspension in which 80% of the particles had diameters below 1 micron. This was achieved with the same apparatus and under the same operating conditions as in the preceding Experiments.

Experiment 17 (Illustrating the Invention)

The polyaspartate according to Experiment 10 was used.

Experiment 18 (Illustrating the Invention)

A polyaspartate neutralized to the extent of 50 mol % with sodium hydroxide and 50 mol % with magnesium hydroxide and having weight average molecular weight MW=7350 was used. This salt of polyaspartic acids was obtained by fractionation, with the aid of isopropanol, of a polyaspartate neutralized to the extent of 50 mol % with sodium hydroxide and 50 mol % with magnesium hydroxide and having weight average molecular weight MW=5700.

The milling resulted in a suspension in which 80% of the particles had diameters below 1 micron. This was achieved with the same apparatus and under the same operating conditions as in the preceding Experiments.

Experiment 18 (Illustrating the Invention)

A sodium polyaspartate of weight average molecular weight MW=21,600 was used. This salt of polyaspartic acids was obtained by thermal condensation of aspartic acids in the presence of phosphoric acid, followed by complete hydrolysis of the imide function by sodium hydroxide and magnesium hydroxide.

An aqueous suspension of calcium carbonate of relatively large particle size which suspension had dry matter concentration 76% was prepared from the same natural calcium carbonate as in the preceding Experiments, using the same apparatus and the same method as described above.

The best comminution which could be attained corresponded to 60% of the particles having diameter less than 1 micron. It was not possible to achieve better comminution, despite addition of the milling agent in the amount of 1.37 wt. % (ratio of dry weight of the milling agent to dry weight of the calcium carbonate to be milled). The reason for this limit was that the Brookfield viscosity increased too much.

Table 2 gives the results of the various Experiments of milling with various amounts of milling agents used in this Example (Example 2). As in the preceding Example (Example 1), no sedimentation was observed.

TABLE 2

| | Exp. No. | Mining Agent Used | | | Brookfield Viscosity of the Suspension (mPa-sec, at 20° C. and 76% dry matter) | | | | | |
| | | Neutralization (ion %/ion %) | MW | Dry Matter in the suspension (%) | Amount of the agent used, (%, dry/dry) | At T0 (with 10 rpm) | At T0 (with 100 rpm) | After 8 da (AVAG, with 10 rpm) | After 8 da (AVAG, with 100 rpm) | After 8 da (APAG, with 10 rpm) | After 8 da (APAG with 100 rpm) |
|---|---|---|---|---|---|---|---|---|---|---|---|
| | 12 | 50 Na/50 Mg | 1200 | 76 | — | NOT POSSIBLE TO CARRY OUT MILLING | | | | | |
| | 13 | 50 Na/50 Mg | 1800 | 76 | — | NOT POSSIBLE TO CARRY OUT MILLING | | | | | |
| | 14 | 70 Na/30 Ca | 2400 | 76 | — | NOT POSSIBLE TO CARRY OUT MILLING | | | | | |
| Invention | 15 | 100 Na | 3700 | 76 | 1.23* | 4600 | 1360 | 49000 | 8000 | 16400 | 3560 |
| Invention | 16 | 50 Na/50 Mg | 4200 | 76 | 0.82 | 2370 | 780 | 39700 | 5840 | 6300 | 1950 |
| Invention | 17 | 50 Na/50 Mg | 5700 | 76 | 1.12 | 1900 | 570 | 5250 | 1280 | 1500 | 500 |
| Invention | 18 | 50 Na/50 Mg | 7350 | 76 | 1.19 | 2160 | 560 | 1770 | 510 | 1720 | 460 |
| Invention | 19 | 50 Na/50 Mg | 21600 | 76 | 1.37** | 2200 | 920 | 80000 | 11200 | 5800 | 2100 |

*1.23 corresponds to the amount of milling agent used to achieve 66% of particles having a diameter less than 1 micron. It was not possible to achieve a fineness with >66% of the particles having diameter less than 1 micron.
**1.37 corresponds to the amount of milling agent used to achieve 60% of particles having diameter less than 1 micron. For comminution with >60% of the particles having diameter less than 1 micron, it was not possible to carry out milling.
AVAG: Viscosity measured before agitation of the suspension
APAG: Viscosity measured after agitation of the suspension It is seen from Table 2 that it is possible to carry out milling of calcium carbonate in a highly concentrated aqueous suspension (76%), by using salts of polyaspartic acids having a weight average molecular weight in the range 3500–25,000, preferably 4000–10,000, particularly preferably 5300–8000.

The results of Experiments 15 and 19 indicate that the use of milling agents with weight average molecular weight MW=3700 or 21,600 allows an aqueous suspension of calcium carbonate to be produced which is concentrated, pumpable, non-sedimenting, and sufficiently fine to be used in applications such as a filler in paper pulp. However, the material is insufficiently fine for use in applications such as paper coating (cf. Experiments 16 to 18, in which sufficient such fineness was achieved).

Table 2 also indicates significant differences between the Brookfield viscosity after 8 da storage but before agitation, in the case of use of an agent having weight average molecular weight MW4200 (Experiment 16), as compared to the cases of use of an agent having weight average molecular weight MW=5700 or 7350 (Experiments 17 and 18).

Example 3

Illustration of the use of milling agents comprising mixtures of salts of polyaspartic acids with acrylic homopolymers or copolymers, or mixtures of salts of polyaspartic acids with polysuccinimide.

For each Experiment in this Example, milling was performed on an aqueous suspension of a natural calcium carbonate having mean particle diameter 50 micron, from the region of Orgon, France. The operating conditions and apparatus were the same as in the preceding Examples.

Experiment 20

A mixture having the following composition was used:

75 wt. % of a polyaspartate neutralized to the extent of 50 mol % with sodium hydroxide and 50 mol % with magnesium hydroxide and having weight average molecular weight MW=5700; and 25 wt. % of a polyacrylate neutralized to the extent of 50 mol % with sodium hydroxide and 50 mol % with magnesium hydroxide and having the same weight average molecular weight (=5700).

Experiment 21

A mixture of the same polymers was used, but in the ratio 50 wt. % polyaspartate to 50 wt. % polyacrylate.

Experiment 22

A mixture of the same polymers was used, but in the ratio 25 wt. % polyaspartate to 75 wt. % polyacrylate.

Experiment 23

A mixture having the following composition was used:

25 wt. % of a polyaspartate neutralized to the extent of 50 mol % with sodium hydroxide and 50 mol % with magnesium hydroxide and having weight average molecular weight MW=5700; and 75 wt. % of a copolymer comprised 95 wt. % of units of acrylic acid and 5 wt. % of units of acrylamide and neutralized to the extent of 50 mol % with sodium hydroxide and 50 mol % with magnesium hydroxide, said copolymer also having weight average molecular weight MW=5700.

Experiment 24

A mixture having the following composition was used:

83 wt. % of a polyaspartate neutralized to the extent of 50 mol % with sodium hydroxide and 50 mol % with magnesium hydroxide and having weight average molecular weight MW=5700; and 17 wt. % of a polysuccinimide having the same weight average molecular weight (=5700).

The best comminution which could be attained corresponded to 76% of the particles having diameter less than 1 micron. It was not possible to achieve better comminution, despite addition of the milling agent in the amount of 1.35 wt. % (ratio of dry weight of the milling agent to dry weight of the calcium carbonate to be milled). The reason for this limit was that the Brookfield viscosity increased too much.

Table 3 gives the results of the various Experiments of milling with various amounts of milling agents used in this Example (Example 3). As in the preceding Examples (Examples 1 and 2), no sedimentation was observed.

TABLE 3

| | | Milling Agent Used | | | Brookfield Viscosity of the Suspension (mpa-sec, at 20 ° C. and 76% dry matter) | | | | | |
|---|---|---|---|---|---|---|---|---|---|---|---|
| | Exp. No. | Mixture (% polyaspartate/% polyacrylate for Exp. 20–23 and % polyaspartate/% polysuc-cinimide, for Exp. 24) | MW | Dry Matter in the suspension (%) | Amount of the agent used (%, dry/dry) | At T0 (with 10 rpm) | At T0 (with 100 rpm) | After 8 da (AVAG, with 10 rpm) | After 8 da (AVAG, with 100 rpm) | After 8 da (APAG, with 10 rpm) | After 8 da (APAG, with 100 rpm) |
| Invention | 20 | 75/25 | 5700 | 76 | 1.12 | 1700 | 480 | 7000 | 1480 | 1940 | 600 |
| Invention | 21 | 50/50 | 5700 | 76 | 1.14 | 1870 | 560 | 5320 | 1220 | 1670 | 500 |
| Invention | 22 | 25/75 | 5700 | 76 | 1.17 | 1600 | 460 | 5300 | 1130 | 1400 | 430 |
| Invention | 23 | 25/75 | 5700 | 76 | 1.29 | 1650 | 480 | 5850 | 1250 | 1550 | 480 |
| Invention | 24 | 83/17 (Polysuccinimide) | 5700 | 76 | 1.35* | 1400 | 480 | 5200 | 1260 | 1300 | 430 |

*1.35% corresponds to the amount of milling agent used to achieve 76% of particles having diameter less than 1 micron. It was not possible to achieve a fineness with >76% of the particles having diameter less than 1 micron.
AVAG: Viscosity measured before agitation of the suppension
APAG: Viscosity measured after agitation of the suspension It is seen from Table 3 that aqueous suspensions of calcium carbonate can be milled with the use of a milling agent comprising a mixture of salts of polyaspartic acids with acrylic acid homopolymers or copolymers, or with polysuccinimides.

This application is based upon French patent Application No. 97 01973 filed with the French Patent Office on Feb. 14, 1997, the entire contents of which are herein incorporated by reference.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States:

1. A method for comminuting an aqueous suspension of coarse mineral material comprising:
   (a) preparing an aqueous suspension containing a coarse mineral material and a milling agent, wherein the milling agent comprises a salt of polyaspartic acid having a weight average molecular weight of 35,000 to 25,000;
   (b) adding a milling body to the aqueous suspension, thereby preparing a mixture; and
   (c) milling the mixture to obtain particles having a median diameter less than 1 micron.

2. The method of claim 1 wherein the salt of polyasparatic acid has been hydrolyzed and neutralized by an agent having a monovalent function.

3. The method of claim 2, wherein the agent having a monovalent function contains cations of sodium, potassium, ammonium, a primary amine, or a secondary amine.

4. The method of claim 1, wherein the salt of polyaspar-atic acid has been hydrolyzed and neutralized by an agent having a monovalent function and an agent having a polyvalent function.

5. The method of claim 4, wherein the agent having a polyvalent function contains cations of calcium, magnesium, zinc, or aluminum.

6. The method of claim 1, wherein the salt of polyaspar-atic acid comprises a homopolymer of aspartic acid.

7. The method of claim 1, wherein the milling agent comprises a mixture of homopolymer of aspartic acid and a polysuccinimide.

8. The method of claim 1, wherein the milling agent comprises a mixture of homopolymer of a salt of aspartic acid and a salt of an acrylic homopolymer or copolymer, wherein the salt of the acrylic homopolymer or copolymer comprises units selected from the group consisting of acrylic acid, methacrylic acid, acrylamidomethylpro-panesulfonic acid, maleic anhydride, acrylamide, methacrylamide, a phosphoric acid ester of hydroxym-ethyl acrylate, a phosphoric acid ester of hydroxyethyl acrylate, a phosphoric acid ester of hydroxymethyl methacrylate, a phosphoric acid ester of hydroxyethyl methacrylate, and mixtures thereof.

9. The method of claim 1,
wherein the milling agent comprises a homopolymer of a salt of aspartic acid and a salt of an acrylic homopolymer or copolymer,
the salt of the acrylic homopolymer or copolymer comprises units of a phosphoric acid ester of an acrylate, and
the acrylate is hydroxymethyl acrylate, hydroxyethyl acrylate, hydroxymethyl methacrylate, or hydroxyethyl methacrylate.

10. The method of claim 1, wherein the polyaspartic acid has a weight average molecular weight of from 4,000 to 10,000.

11. The method of claim 1, wherein the polyaspartic acid has a weight average molecular weight of from 5,300 to 8,000.

12. The method of claim 1, wherein the milling agent is a solution or a powder.

13. The method of claim 1, wherein the ratio of the dry weight of the milling agent to the dry weight of the mineral material is from 0.2 to 2 wt. %.

14. The method of claim 1, wherein the aqueous suspension has a dry matter content of 70 wt. %.

15. An aqueous suspension containing a comminuted mineral material,
wherein the aqueous suspension is prepared by the method of claim 1.

16. The aqueous suspension of claim 15,
wherein the ratio of the dry weight of the milling agent to the dry weight of the comminuted mineral material is from 0.2 to 2 wt. %,
the dry matter content of the aqueous suspension is 70 wt. %, and
the comminuted mineral material contains particles having a median diameter of less than 3 microns.

17. The aqueous suspension of claim 15, wherein the comminuted mineral material contains particles having a median diameter of less than 1 micron.

18. The aqueous suspension of claim 15, wherein the comminuted mineral material contains natural calcium carbonate, synthetic calcium carbonate, or dolomite.

19. A composition selected from the group consisting of a paper coating, a filler for the formulation of paper pulp, and an additive for the formulation of paper pulp, wherein the composition comprises the aqueous suspension of claim 6.

* * * * *

UNITED STATES PATENT AND TRADEMARK OFFICE
CERTIFICATE OF CORRECTION

PATENT NO. : 5,998,526

DATED : DECEMBER 7, 1999

INVENTOR(S): JEAN-MARC SUAU ET AL

It is certified that an error appears in the above-identified patent and that said Letters Patent is hereby corrected as shown below:

Column 13, line 41, "35,000" should read --3,500--.

Signed and Sealed this

Twenty-sixth Day of December, 2000

*Attest:*

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 5,998,526

DATED : December 7, 1999

INVENTOR(S): Jean-Marc SUAU et al.

It is certified that an error appears in the above-identified patent and that said Letters Patent is hereby corrected as shown below:

On the title page, item [30], the Foreign Application Priority Data
should read as follows:

--[30] Foreign Application Priority Data

Feb. 14, 1997   [FR]   France........97 01973--

Signed and Sealed this

Thirteenth Day of March, 2001

Attest:

NICHOLAS P. GODICI

Attesting Officer      Acting Director of the United States Patent and Trademark Office